(12) United States Patent
Westall

(10) Patent No.: US 7,154,439 B2
(45) Date of Patent: Dec. 26, 2006

(54) COMMUNICATION SATELLITE CELLULAR COVERAGE POINTING CORRECTION USING UPLINK BEACON SIGNAL

(75) Inventor: Kenneth E. Westall, Clayton, NC (US)

(73) Assignee: Northrop Grumman Corporation, Los Angeles, CA (US)

( * ) Notice: Subject to any disclaimer, the term of this patent is extended or adjusted under 35 U.S.C. 154(b) by 568 days.

(21) Appl. No.: 10/654,507

(22) Filed: Sep. 3, 2003

(65) Prior Publication Data

US 2005/0048915 A1 Mar. 3, 2005

(51) Int. Cl.
*H04B 7/185* (2006.01)

(52) U.S. Cl. .......................... 342/358; 342/77; 455/13.3

(58) Field of Classification Search ................... 342/76, 342/77, 354, 358, 359; 455/12.1, 13.3, 427, 455/429
See application file for complete search history.

(56) References Cited

U.S. PATENT DOCUMENTS

| | | | |
|---|---|---|---|
| 4,599,619 A | * | 7/1986 | Keigler et al. .............. 342/352 |
| 5,184,139 A | * | 2/1993 | Hirako et al. ............... 342/354 |
| 6,127,967 A | * | 10/2000 | Ghazvinian et al. ......... 342/354 |
| 6,393,255 B1 | * | 5/2002 | Lane .......................... 455/13.3 |
| 6,433,736 B1 | * | 8/2002 | Timothy et al. ............ 342/359 |
| 6,504,502 B1 | * | 1/2003 | Wu et al. .................... 342/354 |
| 6,771,217 B1 | * | 8/2004 | Liu et al. .................... 342/368 |
| 2004/0242152 A1 | * | 12/2004 | Jarett ........................ 455/12.1 |

OTHER PUBLICATIONS

J.T. Nessmith and W.T. Patton; "Tracking Antennas;" pp. 38.

* cited by examiner

*Primary Examiner*—Dao L. Phan
(74) *Attorney, Agent, or Firm*—Posz Law Group, PLC

(57) ABSTRACT

A communication satellite cellular coverage pointing correction using uplink beacon signal is provided. A ground-based beacon transmits a monopulse tracking signal or a Traveling Wave Coupler (TWC) tracking signal to a specialized tracking feed section located within each uplink and downlink antennae of a satellite. From the monopulse or TWC tracking signal, a pointing correction is determined for each reflector, for example, the angle off boresight and the angle between the present beam direction and the target direction. Each reflector is then gimbaled to re-point the reflector to the target area. In this way, both uplink and downlink antennae are provided with closed-loop control over antenna pointing.

18 Claims, 3 Drawing Sheets

COMMUNICATION SATELLITE CELLULAR COVERAGE POINTING CORRECTION USING UPLINK BEACON SIGNAL

BACKGROUND OF THE INVENTION

The present invention generally relates to a method for correcting the pointing of a satellite antenna. More particularly, the present invention relates to a method for correcting the pointing of a satellite multiple aperture, multiple beam antenna using an earth-based beacon received by a satellite-based tracking feed for each antenna aperture.

Satellite-based communications systems are highly reliant upon accurate antenna orientation. Due to the considerable distance between an orbiting satellite and the earth, a flawed orientation of only a few degrees (or in some cases much less than one degree) may have a great impact on overall system performance. Imperfections in orientation or alignment may arise from a number of factors including subtle imperfections in manufacture, mechanical stresses placed on the system components while in orbit or during entry into orbit, and the stresses inherent in the orbital environment, such as solar-induced heat fluctuations, for example.

In cellular satellite-based communications systems, antenna pointing is particularly important. The satellite antenna must be accurately pointed because of the narrow beamwidth used to service each communication cell. Typically, in modern systems, each communications cell is serviced by an antenna beam with a 0.7 degree half-power beamwidth. Thus, in systems of this type, a pointing error of only a fraction of a degree may have a considerable impact on system performance and consequently system revenue. Additionally, cellular satellite-based communications systems are typically configured so that a single antenna structure may service several cells within the area of coverage. The specific cells serviced by the antenna are sometimes referred to as a service pattern, a frequency reuse pattern, a cellular coverage pattern, or simply an antenna pattern. Thus, a pointing error in a single antenna may adversely impact many cells within the communications area.

FIG. 1 illustrates a typical cellular communications system 100 in which a pointing error has occurred. The cellular communications system 100 includes a satellite 110 carrying an antenna 120 which generates numerous beams 130. Each beam is directed towards a specific cell in an earth-based cellular coverage pattern 150, shown as solid circles. The beams 130 generated by the antenna 120 are designed to provide communications with several communication cells (160–166). However, due to the pointing error of the antenna 120, the actual area of coverage for the beams is shown by the off-pointed spot beams (170–176) with coverage areas indicated by dashed circles.

Because the spot beams are not correctly aligned with the cellular coverage pattern 150, several problems arise. For example, if the antenna is an uplink antenna, the user terminals may need to provide additional power to communicate successfully with the satellite 110. Additional gain may increase costs, power consumption, and the system's overall interference level, thus decreasing performance.

Alternately, if the antenna is a downlink antenna, additional transmit power may be necessary at the satellite. However, this additional power may interfere with communications in other cells, quickly drain the limited power reserves onboard the satellite, and increase the cost, weight, and complexity of the satellite.

In a typical cellular communications system, the uplink communications beams and the downlink communications beams are generated at separate antennas. Different antennas are used because the uplink and downlink take place in different frequency ranges and the antenna size is adapted to the frequency of communication. For the reasons explained above, both uplink and downlink antennas must be accurately pointed.

An economic and operative premium is placed on the ability of the satellite to accurately point antennas, particularly antennas such as Multiple Beam Antenna (MBA) apertures that provide service for many cells simultaneously. Consequently, satellite spacecraft and antenna designers in the past were forced to develop and implement extremely accurate attitude control subsystems and very accurately aligned and thermally stable structures to maintain acceptable antenna pointing. The result was significant additional cost and complexity in the satellite design, construction, and operation.

Typically, when a satellite is installed in orbit, the pointing of the satellite is carefully adjusted. However, faults in installation or the stress of operation may induce a pointing error. While the satellite may be equipped with an attitude control system allowing the satellite to adjust its position relative to the earth (and thus the pointing of the antennae) adjustments in attitude may provide too coarse an adjustment. Additionally, adjusting the pointing of a single antenna through attitude control may induce a pointing error in other antennas mounted on the satellite.

Satellite antennas are often implemented as a reflector such as a Casegrain reflectors system or an offset parabolic reflector, for example. Thus, often in the implementation of a satellite communication system, the pointing of the reflectors is adjusted during installation only and the system is made to perform regardless of pointing error and the corresponding communications degradation. This is the "fix and forget" method of installation.

However, more advanced satellites have been constructed with antenna gimbals which allow the pointing of the antenna to be adjusted independent of the attitude of the satellite. The gimbal is mounted on the satellite and provides mechanical rotation for the antenna around the mounting point of the gimbal. Typically, in these cases, the antenna is a dish reflector with a center mounted gimbal.

Although gimbaling of a reflector allows the reflector to be independently adjusted and re-pointed, the correct pointing of the reflector must still be determined. One method of pointing the reflector is to measure the uplink power from the received users in the communication cell. If the uplink power of each user is measured, then the reflector can be positioned to maximize the average power of the users. While this method may be somewhat effective if the users are evenly spread throughout the cell, this method does not yield an accurate pointing of the reflector if the users are located near the cell edge. Additionally, interference and environmental and atmospheric effects may impact the receive signal power and cause further pointing error. Furthermore, measuring the received power from users and determining the maximum power positioning of the satellite adds additional complexity, cost, and weight to the satellite.

Thus, a need has long existed for increased accuracy in the pointing of satellite antenna, particularly in a cellular communications satellite system.

SUMMARY OF THE INVENTION

One object of the present invention is to provide a method and apparatus for satellite antenna pointing correction.

Another object is to provide satellite antenna pointing correction using an uplink beacon signal.

A further objective of the present invention is to minimize the cost and complexity of hardware used to provide satellite antenna pointing correction.

One or more of the foregoing objects are met in whole or in part by the satellite antenna pointing correction provided by the present invention. The present invention provides a ground beacon transmitter (or multiple beacon transmitters) transmitting a tracking beacon from a predetermined ground location. The tracking beacon is received by monopulse tracking feeds in each of the satellite's uplink and downlink antenna apertures. The tracking feeds are placed in each aperture at a location that prevents interference with communications feeds while providing monopulse tracking of the beacon transmitter's location relative to the antenna pointing. The monopulse response of each antenna aperture is analyzed to determine the pointing of the antenna aperture. Satellite gimbals on each reflector are adjusted to achieve a desired monopulse tracking response, ensuring accurate closed-loop pointing of all satellite antenna apertures and beams for that reflector.

For the uplink antennae, the beacon signal occupies only a small fraction of the allocated uplink frequency band, thus yielding a negligible effect on satellite data throughput capacity. For the downlink antennae, the difference in uplink and downlink frequencies (approximately 30 and 20 Ghz, respectively, for Ka-band satellite systems) enables the co-location of a tracking feed with several transmitting feeds within a downlink feed cluster without impacting communications.

These and other features of the present invention are discussed or apparent in the following detailed description of the preferred embodiments of the invention.

DETAILED DESCRIPTION OF THE PREFERRED EMBODIMENTS

Before turning to the drawings, a description of the monopulse tracking technique used in the present invention is provided. A monopulse tracking signal may, in general, be used to determine the position of a receiver relative to a transmitter. For example, a monopulse tracking feed may be implemented using a single corrugated horn and a tracking coupler. The coupler uses a longitudinal traveling wave mechanism and uses the circular Transverse Electric (TE) modes, $TE_{11}$, and $TE_{21}$, that provide the sum and the difference channels, respectively, to achieve wideband monopulse tracking. The main beam is obtained on the boresight axis of the antenna when only the dominant mode ($TE_{11}$) is excited at the aperture of the feed. When the beam is off the boresight axis, higher order modes ($TE_{21}$) are excited in the feed. The amplitude of the $TE_{21}$ mode is proportional to the angle off boresight and a null is obtained at boresight. Thus, the angle off boresight is determined by comparing the amplitudes of the dominant mode and the higher order modes.

To determine the angle between the present boresight direction and the target direction, two antennae separated by a small distance are employed. The separation of the antennae induces a small phase difference when the target is off the boresight axis. The angle between the boresight direction and the target direction may be derived by comparing the relative phase of the two signals received simultaneously. Using two antennae does not affect the $TE_{11}$ and $TE_{21}$ mode measurements.

Thus, the angle off boresight may be determined from the $TE_{11}$ and $TE_{21}$ modes indicating how far the antenna must be redirected. Additionally, the angle between the present boresight direction and the target direction may be determined from the phase difference indicating the direction in which the antenna is to be redirected. From the knowledge of the direction and distance in that direction that the antenna is to be re-pointed, accurate pointing may be achieved.

Even if the monopulse system is able to choose a specific uplink, monopulse tracking of the uplink only delivers pointing information concerning the uplink itself, and not the accompanying downlink that also services the same communication cell. Although the downlink antenna may be made to slave to the pointing of the uplink antenna, this yields a less accurate, pseudo-open-loop tracking mode. Thus, the present invention provides a way to establish (as explained below) independent tracking for the downlink.

Figure 1:
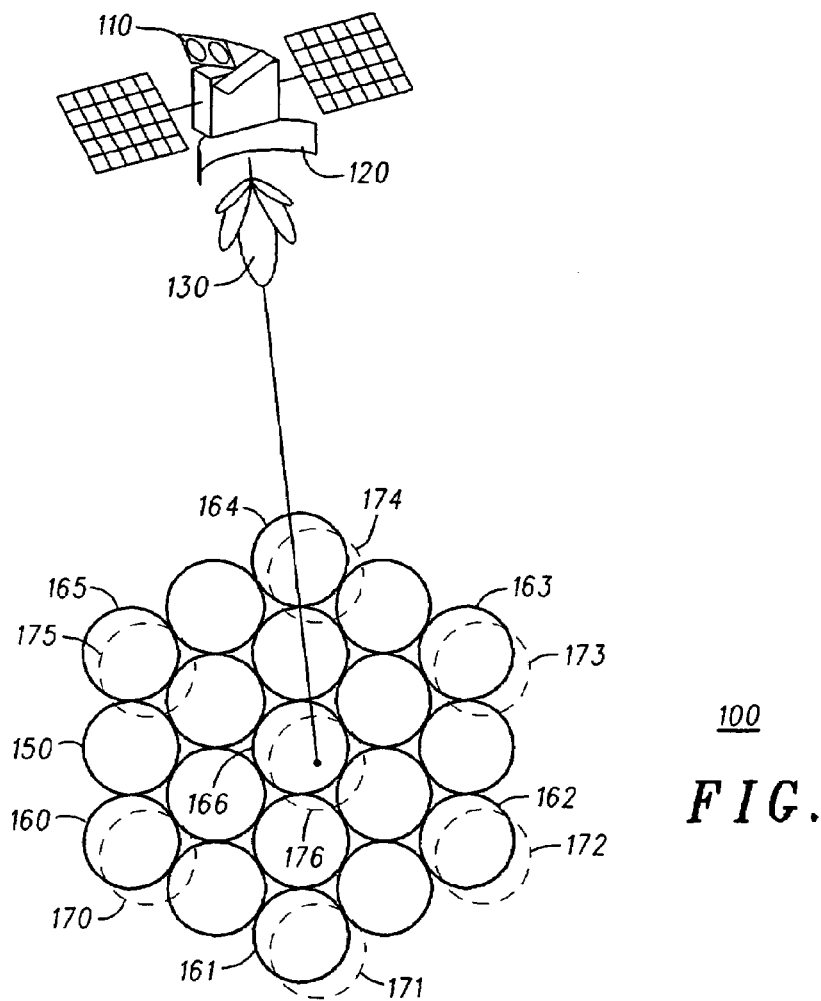
FIG. 1 shows a typical cellular communications system in which a pointing error has occurred.
Figure 2:
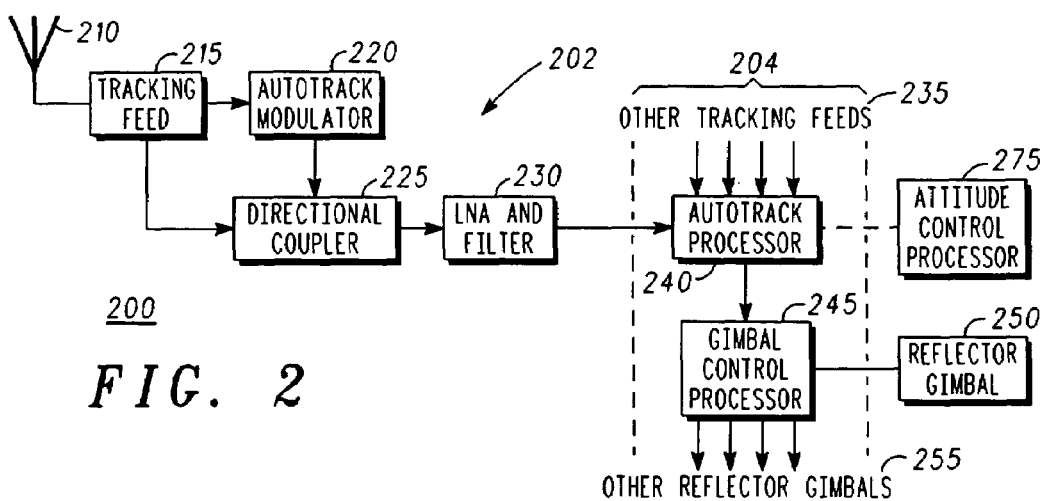
FIG. 2 illustrates a preferred embodiment of the satellite-based portion of the beam pointing correction system of the present invention.

Turning now to FIG. 2, that figure illustrates a preferred embodiment of the satellite-based portion of the beam pointing correction system 200 of the present invention. The beam pointing correction system 200 provides closed-loop tracking for both the uplink and downlink beams of a communications satellite. The beam pointing correction system 200 shows an exemplary tracking feed section 202 which includes a feed horn 210, a tracking feed 215, and autotrack modulator 220, a directional coupler 225, and a Low Noise Amplifier (LNA) and filter 230. All the tracking feed sections of the satellite (including the exemplary tracking feed section 202 and all other tracking feeds 235) communicate with a processing section 204 on the satellite which includes an autotrack processor 240 and a gimbal control processor 245. The gimbal control processor 245 communicates with all the individual reflector gimbals of the satellite (including an exemplary reflector gimbal 250 and all other reflector gimbals 255 on the satellite). The exemplary reflector gimbal 250 is assumed below to be the reflector gimbal associated with the exemplary tracking feed section 202.

In operation, a monopulse signal is directed to the feed horn 210 of the exemplary tracking feed section 202 by a ground beacon transmitter. The feed horn 210 operates as a waveguide to propagate the monopulse signal to the tracking feed 215 where the monopulse signal is coupled into an electrical connection.

The tracking feed 215 transfers the monopulse signal to both the autotrack modulator 220 and the directional coupler 225. The autotrack modulator 220 determines the angle off boresight by comparing the amplitude and phase of the dominant mode and the harmonic mode of the received monopulse signal. The autotrack modulator 220 then transmits a representative angle to the directional coupler 225.

The angle off boresight is the difference between boresight and the present pointing direction and is thus a magnitude, rather than a vector measurement. Thus, the angle measurement indicates how far apart the present angle and boresight are, but not what direction to redirect the antenna to correct the angle. For example, in two dimensions, if the boresight is indicated as a point, the angle measurement determined by the autotrack modulator 220 yields a radius upon which the present beam pointing lies, but does not provide the direction towards boresight. The antenna redirection could be determined by consecutive comparisons of the response at different angles, but a more elegant solution is presented below.

The directional coupler 225 receives the monopulse signal from the tracking feed 215 and the angle from the autotrack modulator 220. The directional coupler 225 then uses the phase difference between the monopulse signal's $TE_{11}$ and $TE_{21}$ modes as described above to determine the direction to re-point the beam and to generate a correction (the "redirection" signal). The directional coupler 225 then transmits both the angle signal and the redirection signal to the autotrack processor 240 in the processing section 204.

The autotrack processor 240 receives the angle signal and the redirection signal from the tracking feed 202 and all other tracking feeds 235 present on the satellite. The autotrack processor 240 then determines the pointing correction for the reflector of each feed.

The autotrack processor 240, after determining the pointing correction, transmits the desired correction for each reflector to the gimbal control processor 245. The gimbal control processor 245 activates and controls the reflector gimbals on the satellite, including the reflector gimbal 250 as well as all other reflector gimbals 255. For example, the gimbal control processor 245 transmits control signals to the exemplary reflector gimbal 250 directing the exemplary reflector gimbal 250 to adjust the reflector pointing. The exemplary reflector gimbal 250 responds to the control signals by moving (also called gimbaling) the reflector to adjust the reflector pointing.

Although the preferred embodiment described above pertains to a satellite wherein the pointing of each reflector may be adjusted by a reflector gimbal, the present invention may also be implemented in a satellite where one or more of the reflectors lack reflector gimbals. For instance, a satellite may have several reflectors that may be adjusted with reflector gimbals and a single fixed reflector that does not gimbal. Each reflector, including the non-gimbaling reflector, may nevertheless include a tracking feed as described above. However, because one of the reflectors is fixed, the autotrack processor additionally transmits control signals to the satellite's attitude control processor 275.

The satellite's attitude control processor 275 then adjusts the orientation of the entire satellite to achieve the desired pointing correction. The pointing correction transmitted to the reflector gimbals (250, 255) takes into account the adjustment of the satellite's attitude in their pointing corrections.

Additionally, the present invention provides significant benefits even if two or more of the satellite's reflectors are fixed. In this case, the autotrack processor 240 uses the tracking feeds from each fixed reflector to determine an orientation for the satellite that minimizes the overall pointing error in the antennae. The autotrack processor 240 then transmits control signals to the satellite's attitude control processor 275 to adjust the orientation of the satellite.

Thus, even if all reflectors on the satellite are fixed, the present invention may still be implemented by placing tracking feeds in each reflector (or in a subset of reflectors of interest). The tracking feeds each transmit tracking information to the autotrack processor 240 which determines the satellite orientation that minimizes the overall pointing error for the satellite antennae. The autotrack processor 240 then activates the attitude control processor 275 to adjust the satellite orientation.

While fixed antennae do not offer the level of flexibility of independent adjustment allowed by gimbaling, the present invention still affords an improvement in pointing control. Pointing control with the present invention with fixed reflectors is a closed loop process in which the pointing of each reflector is determined independently. Thus, the pointing error for the entire satellite may be minimized.

Eliminating a reflector gimbal reduces the overall weight of the satellite, making the satellite less expensive to install in orbit. However, although systems with a single fixed reflector may be readjusted by altering the orientation of the satellite, systems with more than one fixed reflector may not be able to fully correct all pointing errors. Thus, there is a trade off between the increased weight and expense of additional gimbals and the increased quality of service of accurate antenna pointing.

It is also noted that only a single monopulse beacon signal is required to provide the pointing correction for both the uplink and downlink beams. The beacon occupies only a small fraction of the allotted uplink frequency band and has a negligible impact on satellite throughput. Furthermore, the significant difference in the uplink and downlink frequencies enables the co-location of a sensitive receive feed for the monopulse tracking system in the midst of the transmitting feeds for the downlink.

Figure 3:
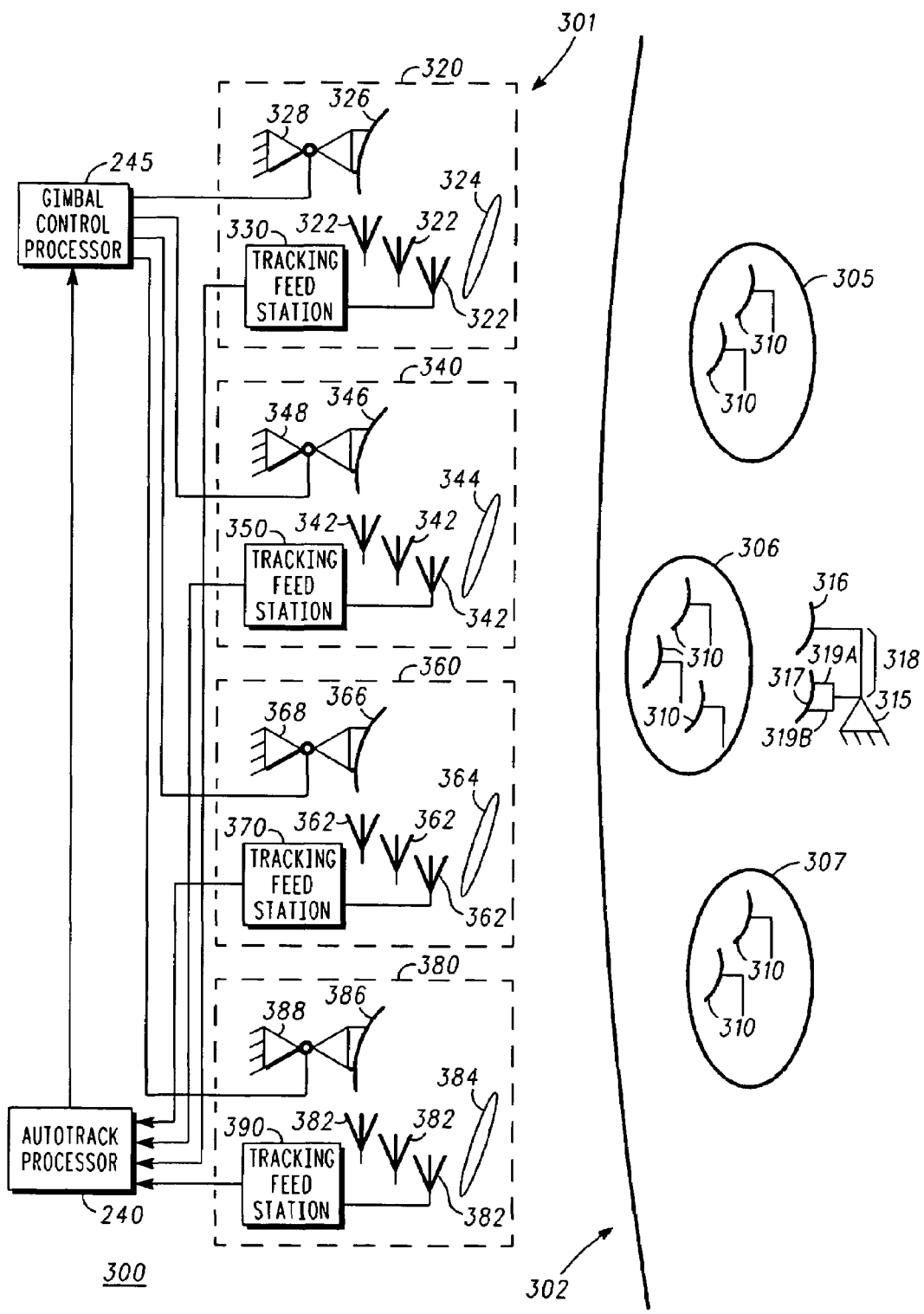
FIG. 3 shows the operation of the beam pointing correction system of FIG. 2 as implemented in a cellular communications satellite system.

FIG. 3 shows a communications system 300 using the beam pointing correction system 200 of FIG. 2. The communications system 300 includes a satellite 301 and terrestrial system 302. The terrestrial system includes service areas 1 through N labeled 305, 306, 307. Each service area 305–307 includes a number of user terminals 310. The terrestrial system 302 also includes a beacon terminal 315.

The satellite 301 includes N downlink antennae, two of which are shown in FIG. 3 as the downlink antenna 1 320 and the downlink antenna N 340. The satellite 301 also includes M uplink antennae, two of which are shown in FIG. 3 as the uplink antenna 1 360 and the uplink antenna M 380. Each uplink and downlink antenna preferably includes a tracking feed section 202 as shown in FIG. 2.

The uplink antenna 1 360 includes communication feeds 362, a subreflector 364, a main reflector 366 mounted on a reflector gimbal 368 as well as a tracking feed section 370 generally identical to the tracking feed section 202 of FIG. 2. In operation, communications signals are transmitted from the multiple user terminals 310 to the uplink antenna 1 360. The communications signals impinge upon the main reflector 366 and are redirected to the subreflector 364. The subreflector 364 redirects the incident signals from the main reflector 366 onto the communication feeds 362.

The main reflector 366 and subreflector 364 are contoured and positioned relative to each other to direct each of the incident communications signals to a different communication feed 362 based on the location of the user terminal 310 on the earth. Thus, for instance, a user terminal 310 inside service area N 307 is directed to a different communication feed 362 than is a user terminal 310 inside service area 1 305.

The beacon terminal 315 transmits a monopulse tracking signal. Like the communications signals from the user terminals 310, the monopulse tracking signal impinges upon the main reflector 366 and is directed to the subreflector 364. The subreflector 364 directs the monopulse tracking signal to the tracking feed 370.

As described above, the monopulse tracking signal is comprised of a pair of signals simultaneously transmitted from the beacon terminal 315. The pair of signals may be generated using two antenna separated by a small, known distance. Thus, the beacon terminal 315 may include a first reflector antenna 316 and a second reflector antenna 317 separated by a distance 318. Alternatively, the monopulse tracking signal may be generated a single reflector with two feeds separated by a small, known distance. In other words, the monopulse tracking beacon 315 may be implemented with a single reflector 317 with a first signal feed 319A and a second signal feed 319B.

Note that the downlink antenna 1 320 includes the communication feeds 322, a subreflector 324, a main reflector 326 mounted on a reflector gimbal 328, and a tracking feed section 330. During operation of the downlink antenna 1 320, communications signals arrive at the communication feeds 332 and are transmitted to the subreflector 324. The signals impinge upon the subreflector 324, are reflected onto the main reflector 326 and are transmitted to the user terminals 310. The signals from each of the communication feeds 322 may be directed to individual user terminals 310 inside individual service areas 305–307.

The main reflector 326 and subreflector 324 are contoured and positioned relative to each other to direct each of the incident signals from the communication feeds 322 to a different service area 305–307 on the earth. Thus, for instance, the positioning of an individual communication feed determines the angle and location that the signal from the feed will impinge upon the subreflector 324 and the main reflector 326 and thus where on the surface of the earth the signal will be directed.

As noted above, the beacon terminal 315 transmits a monopulse tracking signal. Although the downlink antenna 1 320 is nominally configured for transmitting signals (downlink operation) only, the downlink antenna in the present invention receives the monopulse tracking signal using, for example, a feed horn adapted to receive the monopulse tracking signal. The monopulse tracking signal impinges upon the main reflector 326 and is directed to the subreflector 324. The subreflector 324 directs the monopulse tracking signal to the tracking feed section 330.

The structure of each downlink antenna is generally identical to the structure of the downlink antenna 1 320, although each downlink antenna may be directed to a different location on the earth (and thus the pointing of the main reflector, subreflector, communication feeds and tracking feed may differ). Thus, the downlink antenna N 340 includes communication feeds 342, a subreflector 344, a main reflector 346 mounted on a reflector gimbal 348, and a tracking feed section 350.

Similarly, the structure of each uplink antenna is generally identical to the structure of the uplink antenna 1 360, although each uplink antenna may be directed to a different location on the earth (and thus the pointing of the main reflector, subreflector, communication feeds and tracking feed may differ). Thus, the uplink antenna M 380 includes communication feeds 382, a subreflector 384, a main reflector 386 mounted on a reflector gimbal 388, and a tracking feed section 390.

The tracking feed section of each uplink and downlink antenna 330, 350, 370, 390 is generally identical to the tracking feed section 202 of FIG. 2. In operation, the monopulse tracking signal transmitted by the beacon terminal 315 is received and processed by the tracking feed section 330, 350, 370, 390 of each of the uplink 360, 380 and downlink 320, 340 antennae. Thus, the output of the tracking feed section 330, 350, 370, 390 for each of the uplink 360, 380 and downlink 320, 340 antennae is transmitted to an autotrack processor 240. As described above and in FIG. 2, the autotrack processor 240 then determines the pointing correction for each of the reflectors 326, 346, 366, 386 and transmits the pointing corrections to the gimbal control processor 245. As described above, the gimbal control processor 245 then activates and controls the reflector gimbals 328, 348, 368, 388 for each of the uplink 360, 380 and downlink 320, 340 reflectors 326, 346, 366, 386 to correct the pointing of the reflectors 326, 346, 366, 386. Alternatively or additionally, the attitude control system may be activated to correct non-gimbaled antennae.

Geographically, the monopulse tracking beacon 315 is preferably located outside of the service areas 305–307. Such location minimizes the interference of the monopulse tracking beacon 315 with the communications traffic from the user terminals 310 located within the service areas 305–307.

Although the above preferred embodiment has been described in terms of a single monopulse tracking beacon 315, the present invention may be implemented in a system with multiple monopulse tracking beacons. For instance, the pointing of the uplink reflectors 366, 386 may respond to a first monopulse tracking beacon while the pointing of the downlink reflectors 326, 346 may respond to a second monopulse tracking beacon. Alternatively, each reflector may include additional tracking feeds directed to multiple monopulse beacons which may be triangulated to determine pointing correction. Optionally, the tracking feed may be modified to accept a signal from multiple monopulse beacons.

Alternatively, if the satellite system is a phased array, the array may be phased to re-point the beam in response to signals from the autotrack processor 240 without gimbaling. In other words, while gimbaling provides a mechanical adjustment of the beam pointing, the array may be electronically steered by changing the phase offsets and timing relation of the array components.

Figure 4:
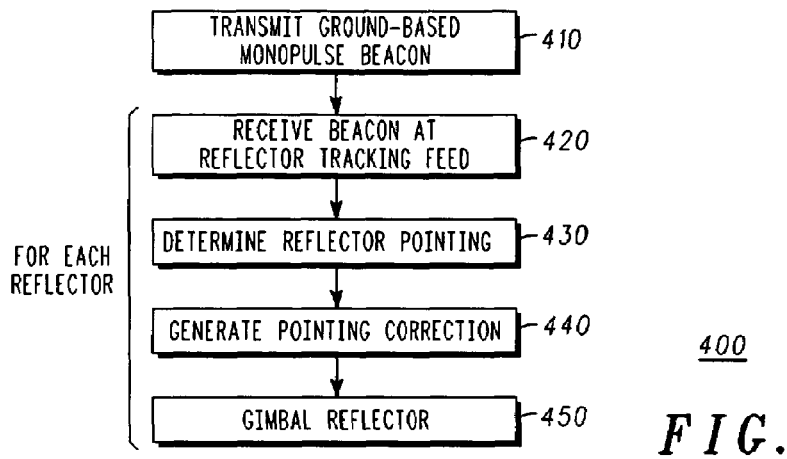
FIG. 4 illustrates a flow chart of a preferred embodiment of the present invention.

FIG. 4 illustrates a flow chart 400 of the operation of the present beam pointing correction system. First, a monopulse tracking signal is transmitted from a ground-based beacon at step 410. The monopulse tracking signal is received at each uplink and downlink reflector by a tracking feed at step 420. Next, the received monopulse tracking signal is analyzed to determine the current pointing of the reflector at step 430. Then, the current pointing and the desired pointing are compared and a pointing correction is generated at step 440. Finally, the reflector is gimbaled to align the reflector to the desired pointing at step 450.

Steps 420 to 450 occur for each reflector mounted on the satellite. This provides closed-loop control for each reflector and minimizes pointing errors. Also, alternatively, in a phased array or adaptive antenna system, the system may adjust its phasing electronically to re-point the beam instead of gimbaling the reflector at step 450.

Steps 410–450 preferably repeat at a set time interval. By periodically repeating the pointing correction, the beam pointing correction system compensates for varying pointing error sources, for example, thermal distortion.

The above embodiment of the beam pointing correction system is employs monopulse tracking feeds. However, other types of tracking feeds may also be employed. For example, a second preferred embodiment of the beam pointing correction system may use a Traveling Wave Coupler (TWC) autotracking system instead of a monopulse tracking system. A preferred TWC tracking system is disclosed in U.S. Pat. No. 5,736,907 which is incorporated herein by reference.

Figure 5:
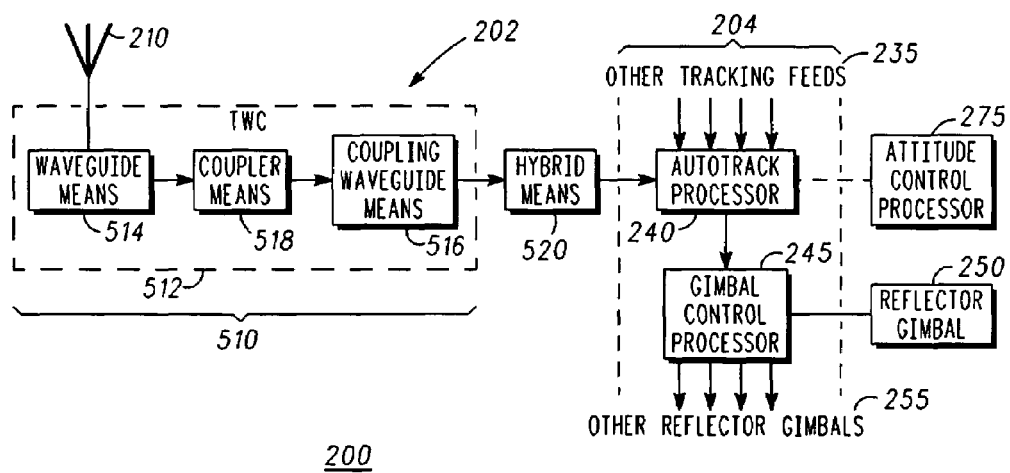
FIG. 5 illustrates the beam pointing correction system of FIG. 2 with the substitution of a TWC tracking system in accordance with various aspects of the present invention.

FIG. 5 illustrates the beam pointing correction system 200 of FIG. 2 with the substitution of a TWC tracking system 510, as described in U.S. Pat. No. 5,736,907, including a traveling wave coupler (TWC) 512 and a hybrid means 520. The TWC 512 includes a waveguide means 514, a coupler means 518, and a coupling waveguide means 516. The TWC tracking system 510 may be inserted into the beam pointing correction system 200 of FIG. 2 between the feed horn 210 and the autotrack processor 240 as shown. In operation, beacon signals are received by the feed horn 210 and passed to the waveguide means 514 of the TWC 512 and then proceed in sequence to the coupler means 518, the coupling waveguide means 516 and the hybrid means 520. The hybrid means 520 interprets the signals passed to it by TWC 512 to generate an azimuth and elevation component of the satellite positioning. The satellite positioning information determined by the hybrid means 520 is similar to the satellite positioning information determined by the monopulse tracking system. The satellite positioning information is passed to the autotrack processor which operated on the satellite positioning information generally similarly to the monopulse tracking system case of FIG. 2. Other TWC tracking feeds 235 may of course be used in place of monopulse tracking feeds at other antenna apertures. The TWC tracking system 510 uses a different beacon signal from the monopulse system, although the TWC beacon signal is well known and is described in the above referenced patent.

Additionally, the TWC tracking system 510 may be substituted for the monopulse system in each tracking feed section 330, 350, 370, 390 of the communications system 300 of FIG. 3. Even with the substitution of the TWC tracking system 510 for the monopulse system, the operation of the communications system 300 proceeds generally similarly as above described, although the beacon terminal 315 is reconfigured to transmit a TWC beacon instead of a monopulse beacon. Also, the beacon terminal 315 only requires at least one signal and thus only requires at least one reflector with a single signal feed.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A satellite-based antenna pointing correction system comprising:
   a first antenna;
   a first tracking feed located in proximity to said first antenna, said tracking feed receiving a beacon signal from a signal beacon;
   an autotrack processor receiving said beacon signal from said first tracking feed, said autotrack processor including a pointing correction output carrying a pointing correction signal based on said beacon signal; and
   a control processor including a pointing correction input coupled to said autotrack processor, said control processor including an antenna correction output coupled to said first antenna and carrying an antenna correction output signal based on said pointing correction signal.

2. The antenna pointing correction system of claim 1 further comprising:
   a second antenna;
   a second tracking feed located in proximity to said second antenna and coupled to said autotrack processor, said second tracking feed receiving said beacon signal;
   wherein said autotrack processor further receives said beacon signal from said second tracking feed and includes a second pointing correction output carrying a second pointing correction signal based on said beacon signal and said control processor further includes a second pointing correction input coupled to said autotrack processor and said control processor includes a second antenna correction output coupled to said second antenna and carrying a second antenna correction output signal based on said second pointing correction signal.

3. The antenna pointing correction system of claim 2 wherein at least one of said first antenna and said second antenna is a downlink antenna.

4. The antenna pointing correction system of claim 1 wherein said first antenna is a phased array antenna.

5. The antenna pointing correction system of claim 1 wherein said antenna correction output signal comprises correction for the attitude of the satellite.

6. The antenna pointing correction system of claim 1 wherein said first tracking feed additionally receives a second beacon signal from a second signal beacon and said autotrack processor additionally receives said second beacon signal from said first tracking feed and includes a pointing correction output carrying a pointing correction signal based on said first beacon signal and said second beacon signal.

7. The antenna pointing correction system of claim 1 wherein said beacon signal is one of a monopulse beacon signal and a Traveling Wave Coupler (TWC) beacon signal.

8. A satellite communication system comprising:
   an uplink antenna;
   a downlink antenna;
   a first signal beacon, transmitting a first beacon signal to said uplink antenna and said downlink antenna;
   an uplink tracking feed, located in proximity to said uplink antenna and receiving said first beacon signal;
   a downlink tracking feed, located in proximity to said downlink antenna and receiving said first beacon signal;
   an autotrack processor, coupled to said uplink tracking feed and said downlink tracking feed, processing said first beacon signal received by said uplink tracking feed and said downlink tracking feed and determining an uplink antenna pointing correction and a downlink antenna pointing correction and including a pointing correction output carrying said uplink and downlink pointing corrections; and
   a control processor, coupled to said autotrack processor, including an uplink antenna correction output coupled to said uplink antenna and carrying an antenna correction output signal based on said uplink pointing correction and a downlink antenna correction output coupled to said downlink antenna and carrying an antenna correction output signal based on said downlink pointing correction.

9. The satellite communication system of claim 8 additionally comprising a second signal beacon transmitting a second beacon signal wherein:

at least one of said uplink tracking feed and said downlink tracking feed receives said second beacon signal from said second signal beacon; and said autotrack processor additionally processes said second beacon signal and determines an antenna pointing correction based on said second beacon signal.

10. The satellite communication system of claim 8 wherein at least one of said uplink antenna and said downlink antenna is coupled to an antenna gimbal and antenna correction output signal is coupled to said antenna gimbal.

11. The satellite communication system of claim 8 wherein at least one of said uplink antenna and said downlink antenna is a phased array antenna.

12. The satellite communication system of claim 8 additionally comprising:

an attitude control processor; and wherein at least one of said uplink antenna correction output and said downlink antenna correction output is coupled to said attitude control processor.

13. The satellite communication system of claim 8 wherein said first signal beacon is one of a monopulse signal beacon and a Traveling Wave Coupler (TWC) signal beacon.

14. A method for correcting the pointing of a satellite-based communications beam comprising:

receiving a beacon signal at an uplink tracking feed located in proximity to an uplink antenna and at a downlink tracking feed located in proximity to a downlink antenna;

determining the pointing of said uplink antenna and said downlink antenna based on said beacon signal;

generating a pointing correction for said uplink antenna and said downlink antenna based on said beacon signal; and repositioning said uplink antenna and said downlink antenna.

15. The method of claim 14 additionally comprising:

transmitting a second beacon signal;

receiving said second beacon signal at one of said uplink tracking feed and said downlink tracking feed;

generating a pointing correction for one of said uplink antenna and said downlink antenna based on said second beacon signal; and repositioning one of said uplink antenna and said downlink antenna in response to said pointing correction based on said second beacon signal.

16. The method of claim 14 wherein said repositioning step comprises the step of gimbaling said antenna.

17. The method of claim 14 wherein at least one of said uplink antenna and said downlink antenna is a phased array antenna and said repositioning step comprises the step of electronically steering said phased array antenna.

18. The method of claim 14 wherein said repositioning step comprises the step of adjusting the attitude of said satellite.

* * * * *